(12) United States Patent
Farag et al.

(10) Patent No.: US 6,844,872 B1
(45) Date of Patent: Jan. 18, 2005

(54) COMPUTER MOUSE HAVING SIDE AREAS TO MAINTAIN A DEPRESSED BUTTON POSITION

(75) Inventors: Abraham S. Farag, East Palo Alto, CA (US); Bartley K. Andre, Menlo Park, CA (US)

(73) Assignee: Apple Computer, Inc., Cupertino, CA (US)

( * ) Notice: Subject to any disclaimer, the term of this patent is extended or adjusted under 35 U.S.C. 154(b) by 387 days.

(21) Appl. No.: 09/687,262

(22) Filed: Oct. 11, 2000

Related U.S. Application Data (63) Continuation-in-part of application No. 09/482,152, filed on Jan. 12, 2000, now Pat. No. 6,373,470.

(51) Int. Cl.[7] .............................................. G09G 5/08
(52) U.S. Cl. ..................................... 345/163; 345/156
(58) Field of Search ......................... 345/163, 164–167, 345/156, 157

(56) References Cited

U.S. PATENT DOCUMENTS

| | | | | |
|---|---|---|---|---|
| 5,956,018 A | * | 9/1999 | Pejic et al. ................. 345/157 |
| 6,088,019 A | * | 7/2000 | Rosenberg .................. 345/156 |
| 6,200,219 B1 | * | 3/2001 | Rudell et al. ................. 463/37 |
| 6,256,013 B1 | * | 7/2001 | Siddiqui ..................... 345/163 |
| 6,373,470 B1 | * | 4/2002 | Andre et al. ................ 345/166 |
| 6,417,843 B1 | * | 7/2002 | Stephens et al. ............ 345/167 |

OTHER PUBLICATIONS

Daveport Pub. No.: US 2001/0050673 A1.*

* cited by examiner

*Primary Examiner*—Regina Liang
*Assistant Examiner*—Jennifer T. Nguyen
(74) *Attorney, Agent, or Firm*—Blakely, Sokoloff, Taylor & Zafman LLP (57) ABSTRACT

A computer mouse having a base member with hold regions. A top member is pivotally coupled to the base member and covers the internal electronics of the mouse. The top member has a main surface with openings to accommodate the hold regions of the base member and leave them exposed to a user's fingers. The top member also acts as a button for the mouse. The hold regions allow a user to lift the mouse while maintaining the top member in a depressed position.

3 Claims, 8 Drawing Sheets

COMPUTER MOUSE HAVING SIDE AREAS TO MAINTAIN A DEPRESSED BUTTON POSITION

CLAIM OF PRIORITY

This application is a continuation-in-part of commonly assigned U.S. patent application Ser. No. 09/482,152, filed Jan. 12, 2000, now U.S. Pat. No. 6,373,470 entitled "Cursor Control Device Having An Integral Top Member" by Farag et al.

BACKGROUND OF THE INVENTION

1. Field of the Invention

The present invention relates generally to cursor control devices for use in conjunction with a computer system.

2. Background Information

Cursor control devices exist in a number of forms, such as joysticks, trackballs, styli and pads, and mice. The computer mouse has been and continues to be a widely used cursor control device. A typical mouse has a body which houses a captured ball, a portion of which extends from the interior of the body. A typical mouse is moved over a flat surface such that the captured ball is in contact with the surface and rolls along the surface in the same direction as the mouse body. The movement of the ball generates two-dimensional data input for corresponding cursor control, the results of which are visible on a display device of the computer. Instead of using a captured ball, a mouse may use optical electronics to generate cursor control signals. A typical mouse also includes an electromechanical switch configured in the form of a clicking button disposed on and flush with the top surface of the mouse. This button is used for various functions, such as data selection and command execution. For example, a user moves the mouse over a surface to cause a corresponding movement of a displayed cursor. A subsequent "single-click" or "double-click" of the button sends an application execution signal to the computer.

Although a mouse button may take various forms, a typical mouse button is disposed near the top and front portion of the mouse where it is easily accessible by a user's fingers. The user's palm typically covers the top and back portion of the mouse such that at least one of the user's fingers (e.g., index finger, middle finger, ring finger) is disposed over the mouse button. Such a button configuration has become commonplace. However, having a separate button located at the front of a mouse can be uncomfortable for those with very large hands, very small hands or deformed hands.

Thus, it is desirable to provide a mouse that may be used easily by users having different hand sizes and/or different degrees of coordination.

SUMMARY OF THE INVENTION

The present invention provides a computer mouse having a base member which includes hold regions. A top member is pivotally coupled to the base member, and the top member has a main surface which is configured to leave the hold regions substantially exposed. The top member forms an integral housing and button.

Additional features and benefits of the present invention will become apparent upon review of the following description.

BRIEF DESCRIPTION OF THE DRAWINGS

Various embodiments of the present invention will be described in detail with reference to the following drawings.

The present invention is illustrated by way of example and not limitation in the accompanying figures.

DETAILED DESCRIPTION

The following description provides embodiments of the present invention. However, it will be appreciated that other embodiments of the present invention will become apparent to those of ordinary skill in the art upon examination of this description. Thus, the present description and accompanying drawings are for purposes of illustration and are not to be used to construe the invention in a restrictive manner.

Figure 1:
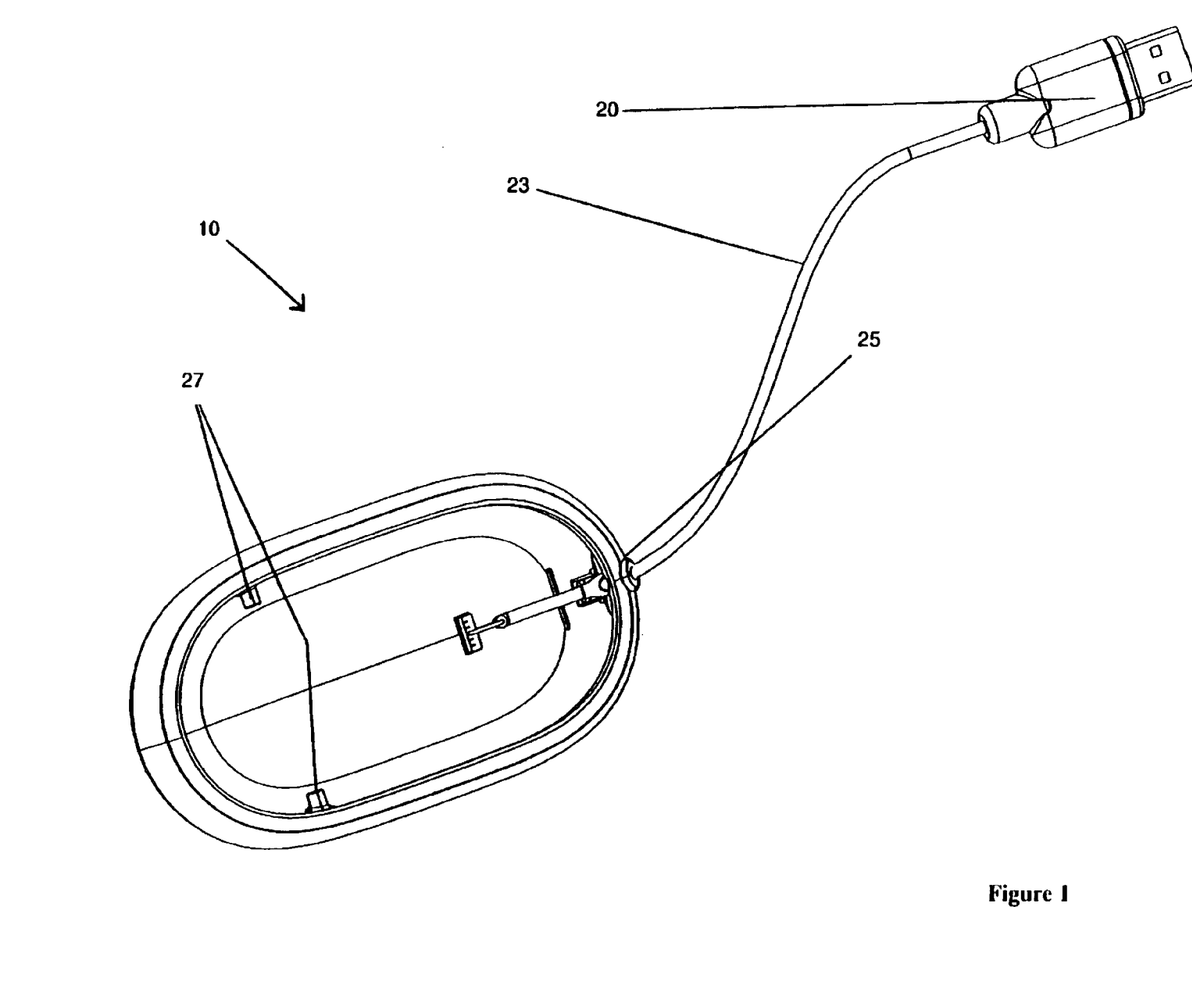
FIG. 1 is a simplified view of a computer mouse in accordance with the teachings of the present invention.
Figure 2:
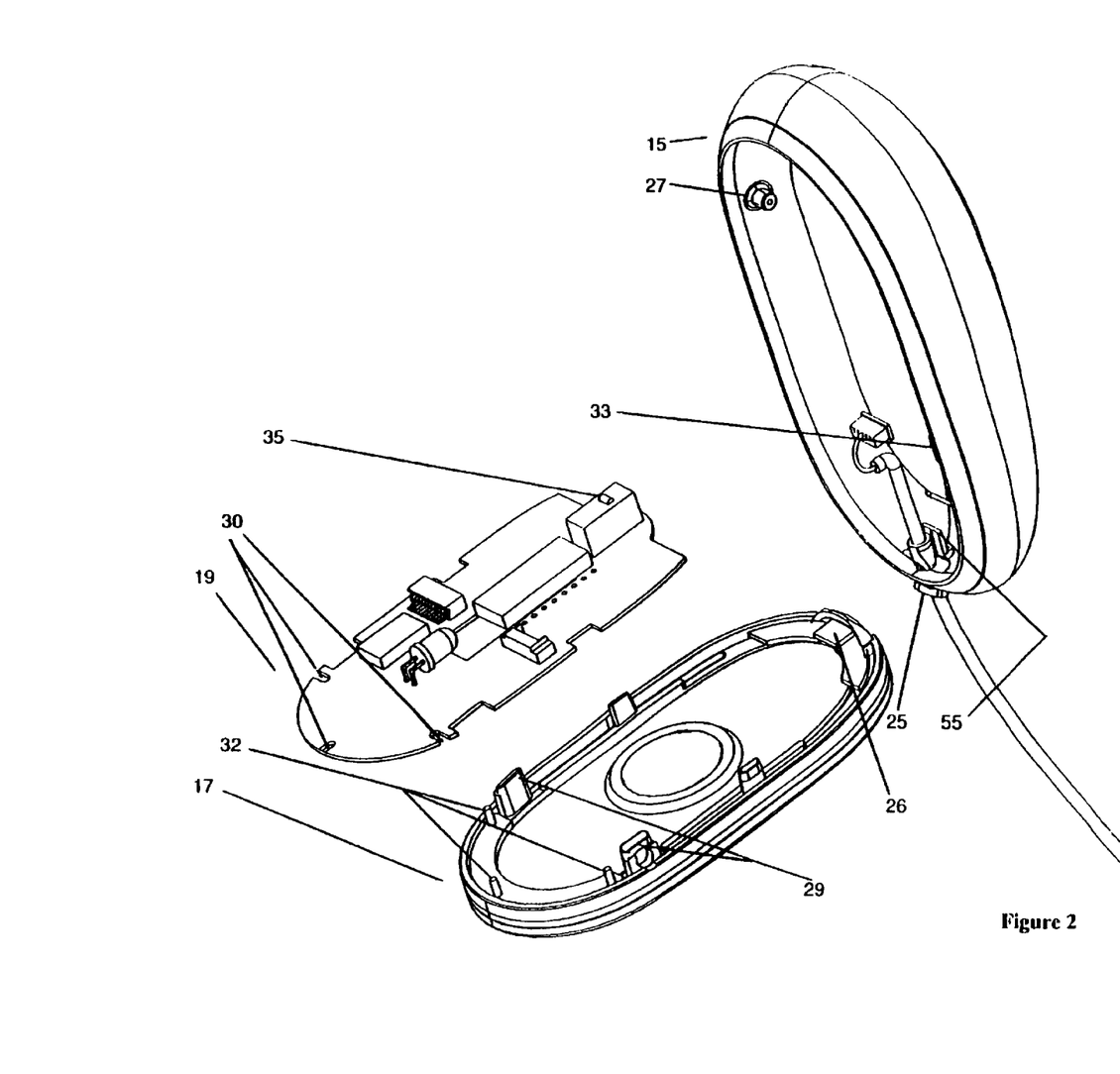
FIG. 2 is a simplified and "de-coupled" view of a computer mouse in accordance with the teachings of the present invention.

FIGS. 1 and 2 illustrate two views of a computer mouse 10 which includes a top member 15, a base member 17 and a printed circuit board (PCB) member 19. Top member 15 and base member 17 together form the housing of mouse 10. In one embodiment, portions of top member 15 and base member 17 are translucent to provide views of the internal electronics of mouse 10. It should be noted that, for the purpose of clarity, not all of the internal components of mouse 10 are shown. Furthermore, it is appreciated that mouse 10 may use a mechanical system (e.g., captured ball) or an optical system to generate cursor control signals. An electrical connector 20, such as a universal serial bus (USB) connector, is used to connect mouse 10 to a computer system (not shown). A cable 23 connects electrical connector 20 to the internal electronics that are mounted on PCB member 19 through a front portion 25 of top member 15. PCB member 19 includes indents 30 which engage pins 32 extending upward from base member 17 to ensure that PCB member 19 is seated securely on base member 17.

Top member 15 has two protrusions 27 which extend within the cavity of top member 15. Protrusions 27 pivotally engage snap mechanisms 29 which extend up from base member 17. When protrusions 27 engage snap mechanisms 29, top member 15 may be depressed toward base member 17 with top member 15 pivoting at the joints formed by protrusions 27 and snap mechanisms 29. When top member 15 and base member 17 are coupled as such, the body of mouse 10 is formed and the internal electronics of mouse 10 are enclosed. A biased spring pad 26 pushes top member 15 away from base member 17 to an "un-clicked" or neutral position by pressing up against tab 55 of top member 15. This position may be defined and delimited by the configuration and action of protrusions 27 and snap mechanisms 29. As a user depresses top member 15 to click for data selection or command execution, an elongated member 33 engages an electrical switch 35 mounted on PCB member 19 to effect a mouse click action. Elongated member 33 is located on the inner surface of top member 15 or of an inner housing of top member 15 (see inner housing 90 of FIG. 4, for example). During the mouse click action, elongated member 33 is pushed 1 against electrical switch 35 and, accordingly, top member 15 is in a "clicked" or depressed position.

It should be particularly noted that top member 15 serves as an integral housing and button. Thus, top member 15 is both a top housing of mouse 10 and a button of mouse 10. Having an all-in-one top housing and button eliminates the need to have a separate button, such as those found on a conventional computer mouse. Because top member/button 15 is an integral piece, a user may push down on numerous points on the surface area of top member/button 15 to effect a clicking action. Specifically, any point on the surface of top member/button 15 above the joint area formed by protrusions 27 engaging snap mechanisms 29 may be pushed down to engage elongated member 33 with electrical switch 35.

During a typical session for a mouse user, it may be necessary for the user to lift the mouse during a "click-and-drag" operation. For example, if a user is moving the mouse on a mouse pad while keeping a button clicked and reaches an edge of the pad, the user must lift and reposition the mouse to a different part of the pad in order to continue the click-and-drag operation. Even if a user is moving the mouse on a large surface area (e.g., a desktop) during a click-and-drag operation, it may be more convenient and more comfortable to lift and reposition the mouse rather than perform a continuous physical "drag." To perform a drag, a user must keep a mouse button depressed (e.g., in a clicked position) while moving the mouse across a surface. If a user needs to or desires to lift the mouse in the middle of a drag, the user must continue to depress the mouse button while lifting the mouse.

Figure 3A:
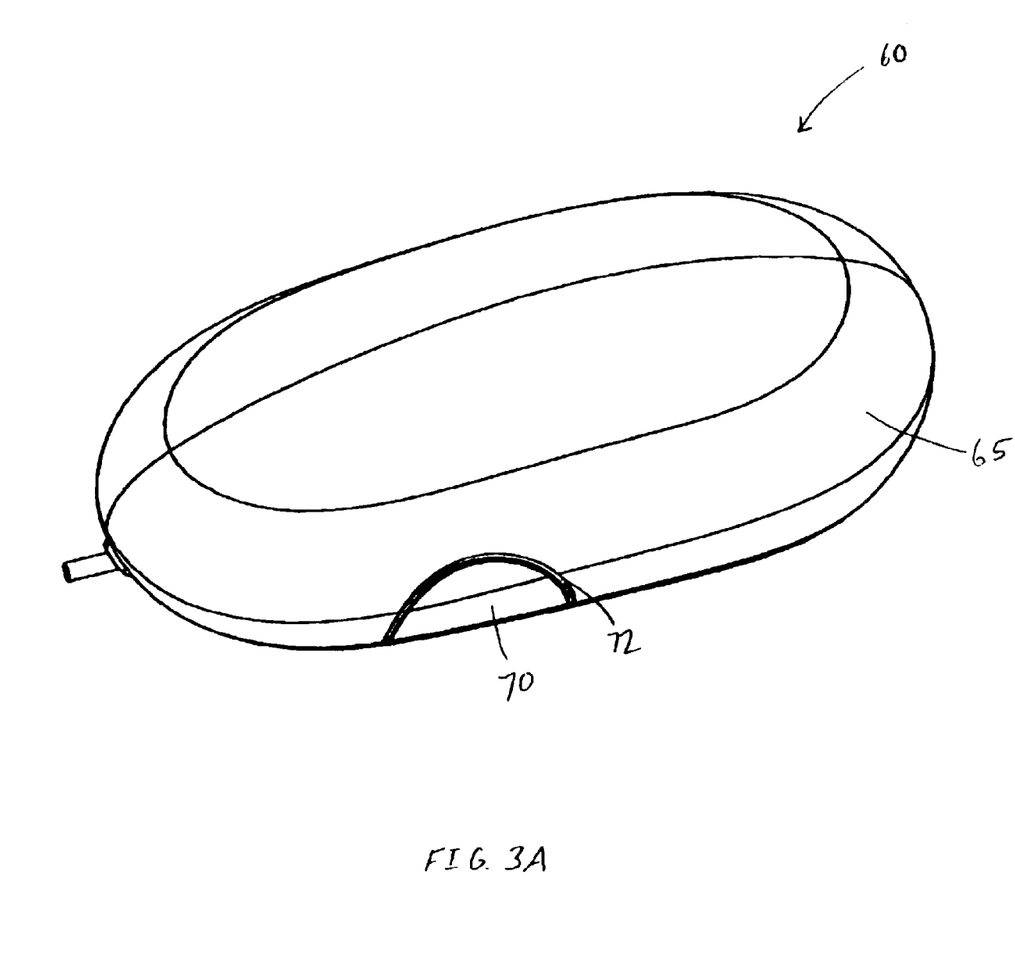
FIG. 3A is a perspective view of a computer mouse having hold regions in accordance with the teachings of the present invention.
Figure 3B:
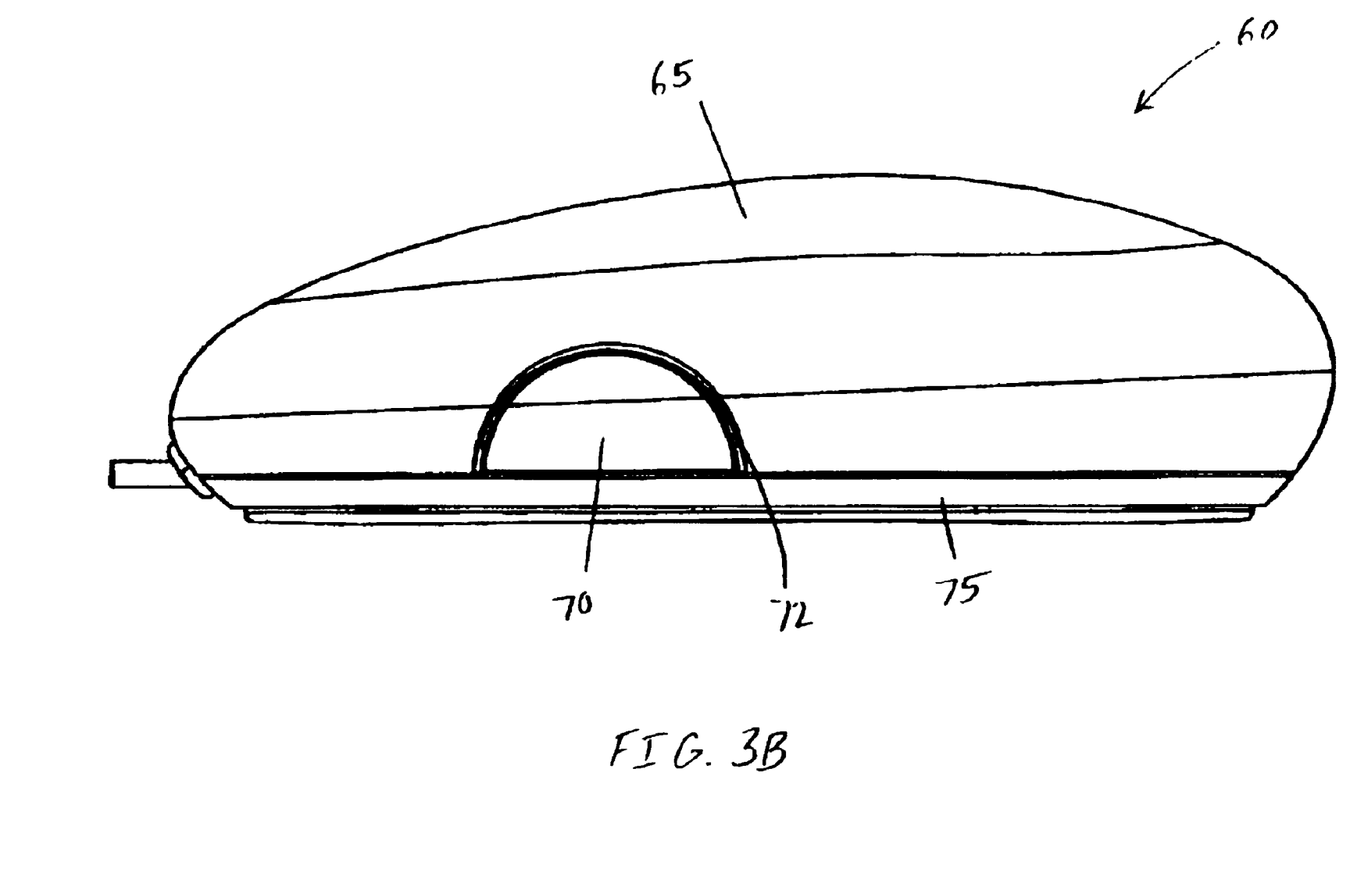
FIG. 3B is a side view of the computer mouse shown in FIG. 3A.

The embodiment of the present invention shown in FIGS. 3A and 3B is a single-button mouse 60 which includes hold areas or side ears 70 to allow a user to lift the mouse 60 while maintaining the mouse button 65 in a clicked position. Mouse button 65 is an integral button and housing similar to top member/button 15. Although only one hold area 70 is shown, it is appreciated that mouse 60 typically has at least two hold areas 70 on opposite sides of mouse 60. Mouse button/housing 65 may be depressed by pushing down on any point along the majority of the surface area of mouse button/housing 65. Mouse button/housing 65 pivots at a point near the bottom area (e.g., closer to user) of mouse 60, as described above in conjunction with FIGS. 1 and 2. In one embodiment, hold areas 70 are tabs which extend substantially vertically from a base member 75. Hold areas 70 may be integrally formed with or attached to base member 75. Openings or cutouts 72 in mouse button/housing 65 are shaped to accommodate hold areas 70 and leave them exposed. The surface of hold areas 70 is typically flush with the surface of mouse button/housing 65.

Because hold areas 70 are fixed and substantially rigid, a user may hold onto hold areas 70 to keep mouse button/housing 65 depressed while lifting mouse 60. For example, a user may use her index finger and/or middle finger to depress mouse button/housing 65 while using her thumb and ring finger to concurrently grasp hold areas 70. Thus, hold areas 70 allow a user to reposition mouse 60 in the middle of a "click and drag" operation.

Figure 4:
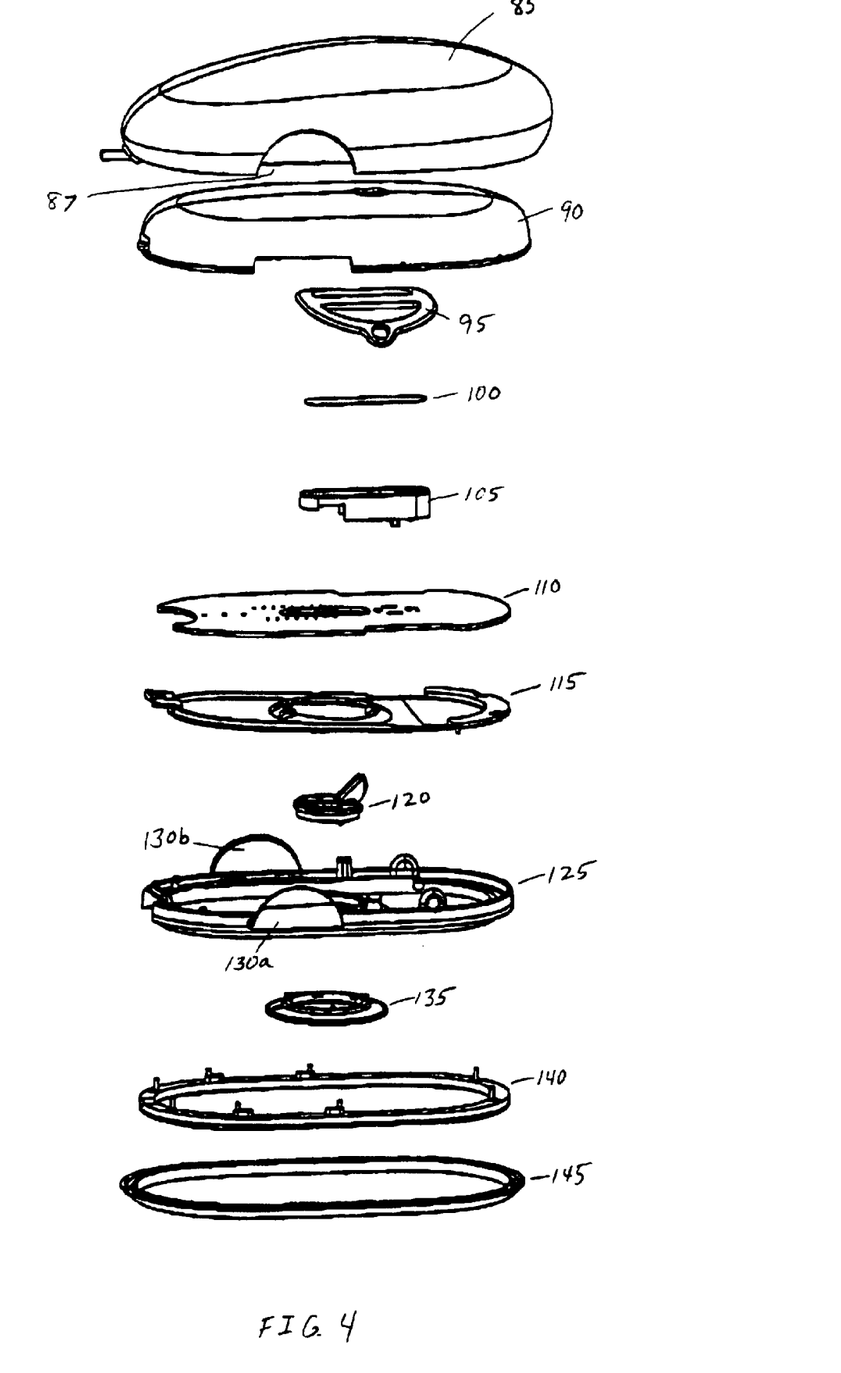
FIG. 4 is an exploded view of a computer mouse having hold regions.

FIG. 4 illustrates an exploded view of a computer mouse having hold regions 130a and 130b. A top housing 85, which is an integral housing and button, is disposed over an inner housing 90. In one embodiment, top housing 85 and inner housing 90 are made of a translucent material such that the interior of the mouse is visible. Although inner housing 90 is not strictly necessary, it does provide an additional visual layer for the computer mouse of the present invention. If inner housing 90 is included, then top housing 85 presses down on inner housing 90, which, in turn, presses down on an electrical switch to effect a mouse click. A cage 95 is placed over a light barrier label 100 and a LED holder 105. LED holder 105 also secures substrate 110. Cage 95 has through holes which mate with protrusions on a base member 125 to secure cage 95. ? 105 is coupled to a substrate 110 which is disposed over a force adjustment plate 115. Optical component 120 includes a lens for tracking a LED. Base member 125 has hold regions 130a and 130b which extend vertically from opposing edges of base member 125. Hold regions 130a and 130b fit into corresponding openings or cutouts 87 in top housing 85 such that they are accessible by a user's fingers.

An adjustment dial 135 is rotatably coupled to base member 125. Adjustment dial 135 is used to decrease or increase the force required to push down on top housing 85 in order to effect a mouse click. An alignment member 140 is disposed below base member 125 and has vertically extending pins which are used to secure and align force adjustment plate 115 and base member 125. It should be noted that alignment member 140 is open in the middle such that the bottom of base member 125 is exposed. Alignment member 140 may be made of a material which facilitates movement of the mouse over a mouse pad or other working surface. A border 145 is disposed around alignment member 140.

Figure 5:
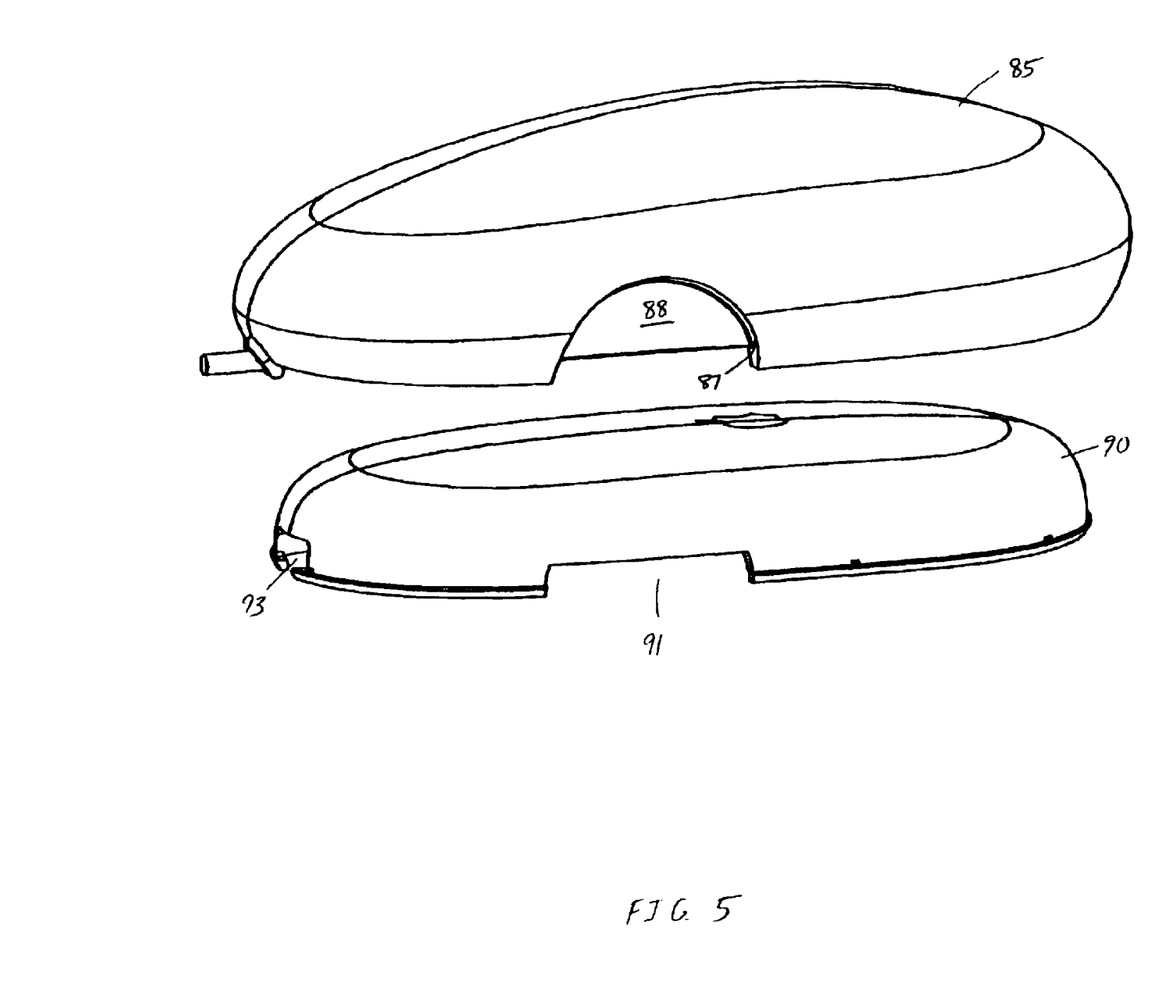
FIG. 5 is a close-up view of different components of the computer mouse shown in FIG. 4.
Figure 6:
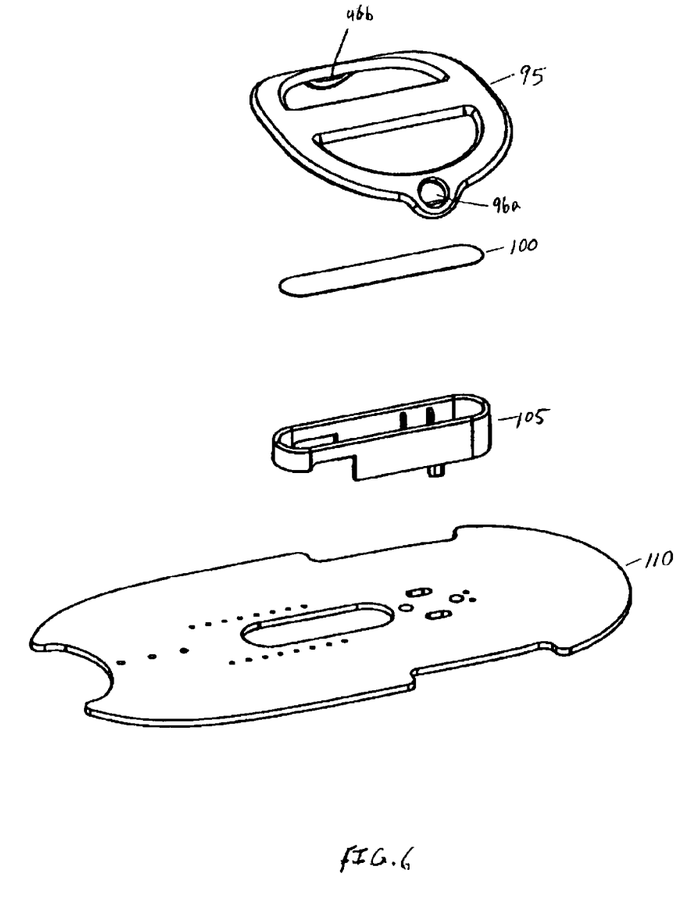
FIG. 6 is another close-up view of different components of the computer mouse shown in FIG. 4.
Figure 7:
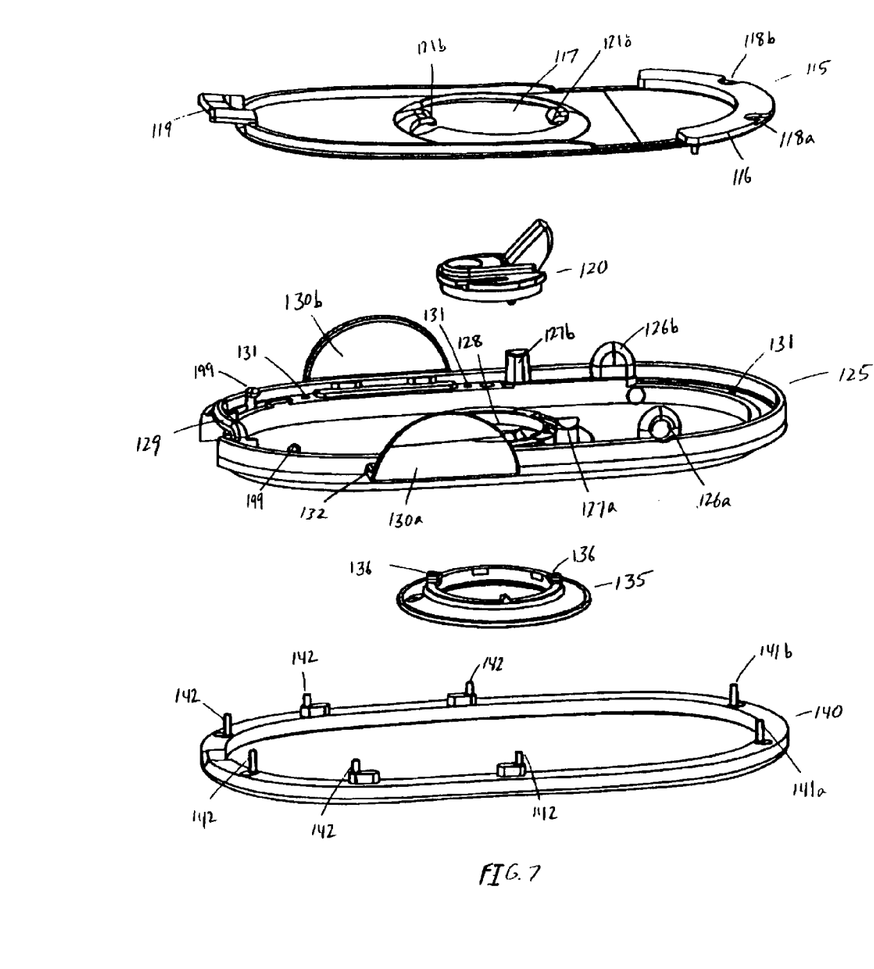
FIG. 7 is yet another close-up view of different components of the computer mouse shown in FIG. 4.

FIGS. 5, 6 and 7 illustrate more detailed views of the components (except member 145) shown in FIG. 4. Top housing 85 has openings or cutouts 87 which accommodate hold regions 130a and 130b. Although only one opening 87 is shown, it is appreciated that top housing 85 has two openings 87, one on each side of top housing 85. In the embodiments shown in the figures, openings 87 do not extend entirely through the wall of top housing 85. Instead, openings 87 extend partially through the wall of top housing 85 to an inner wall 88. A gap below the bottom edge of inner wall 88 accommodates a flange portion 132 of hold regions 130a and 130b. Openings 87 may be shaped to match the shape of hold regions 130a and 130b. It should be noted that openings 87 are large enough to allow top housing 85 to be "clicked" without any substantial interference between the arc of opening 87 and the top edge of hold regions 130a and 130b. An inner housing 90 is covered by top housing 85 and has cutouts 91 (e.g., on opposing sides of inner housing 90) and 93. Cutouts 91 are aligned with openings 87 to accommodate flange portion 132 of hold regions 130a and 130b. Cutout 93 accommodates cables which are coupled to the internal electronics of the mouse.

Cage 95 has through holes 96a and 96b which mate with protrusions 127a and 127b, respectively, extending from base member 125 to hold cage 95 in place. Light barrier label 100 and LED holder 105 are located underneath cage 95. LED holder 105 is coupled to substrate 110.

Force adjustment plate 115 has a flange 116 which is formed with through holes 118a, 118b. Pins 141a, 141b extending vertically from alignment member 140 are disposed through through holes 118a and 118b, respectively. Thus, adjustment plate 115 may be held in place and aligned relative to base member 125 and alignment member 140. Pins 141a, 141b and 142 of alignment member 140 also engage through holes 131 of base member 125 to secure base member 125 and ensure proper alignment among adjustment plate 115, base member 125 and alignment member 140. Adjustment plate 115 also includes a center opening 117 to accommodate optical component 120, two tabs 121a, 121b which extend downward from the rim of opening 117, and a spring pad 119. Tabs 121a, 121b are located along the rim of opening 117 approximately 180 degrees apart from each other. Substrate 110 is seated on top of flange 116 under hooks 199. A tab of top housing 85, such as tab 55 shown in FIG. 2, is seated on spring pad 119 through the underside of a bridge 129 of base member 125. The clamping of adjustment plate 115 toward base member 125 causes spring pad 119 to flex upward and push the tab of top housing 85, which in turn biases top housing 85 to an "un-clicked" or neutral position. The upward flexing of the spring pad-tab combination is limited by bridge 129 of base member 125. It should be noted that top housing 85 includes internal pivots, such as protrusions 27 shown in FIG. 1, which pivotally engage connectors 126a and 126b. Connectors 126a and 126b may be formed with through holes or concavities (as shown) which engage the internal pivots of top housing 85.

Adjustment dial 135 is rotatably disposed onto base member 125 via opening 128, which also accommodates optical component 120. Adjustment dial 135 has two stubs 136 located approximately 120 degrees (or 240 degrees) apart along the rim of adjustment dial 135. In one embodiment, force adjustment plate 115 and adjustment dial 135 are capable of defining three user-adjustable positions. In a first position, neither of stubs 136 touches either of tabs 121a, 121b. Thus, the combination of pins 141a, 141b and through holes 118a, 118b effectively forms a first fulcrum point for the action of force adjustment plate 115. In a second position, one stub 136 is positioned immediately underneath tab 121a, thereby forming a second fulcrum point for the action of force adjustment plate 115. The second fulcrum point increases the force required to "click" top housing 85 because the second fulcrum point is closer than the first fulcrum point to spring pad 119. In a third position, one stub 136 is positioned immediately underneath tab 121b, thereby forming a third fulcrum point for the action of force adjustment plate 115. The third fulcrum point further increases the force required to click top housing 85 because of its proximity to spring pad 119.

It should be noted that top housing 85 generally requires the same amount of downward force for the initial portion of a downward clicking action. Subsequently, the force required to depress top housing 85 through the remaining portion of the downward clicking action varies depending on the previously described fulcrum points. For example, the initial portion may be 1/10 of a millimeter and the remaining portion may be 9/10 of a millimeter.

A force adjustment feature provides more comfortable mouse usage for a variety of users. Some users desire more resistance to mouse clicks, while other users desire less resistance to mouse clicks. However, it is appreciated that it is not necessary to use a force adjustment feature in conjunction with the hold regions of the present invention. The hold regions allow a user to continue a click-and-drag operation by lifting and repositioning the mouse while maintaining the mouse button in a clicked position. Thus, a mouse having an integral housing and button as described herein may be used more effectively.

In the foregoing detailed description, the apparatus and method of the present invention have been described with reference to specific exemplary embodiments. However, it will be evident that various modifications and changes may be made without departing from the broader scope and spirit of the present invention. The present specification and figures are accordingly to be regarded as illustrative rather than restrictive.

What is claimed is:

1. A computer mouse comprising:
   a base member of said computer mouse having hold regions;
   a top member pivotally coupled to said base member, said top member having a main surface configured to leave said hold regions substantially exposed;
   wherein said top member forms an integral housing and button, and said button is activated when said top member pivots toward said base member; and
   an adjuster coupled to said base member, said adjuster being adjustable to control a force required to push said top member.

2. A computer mouse comprising:
   a first side ear;
   a second side ear;
   wherein said first and second side ears are concurrently graspable to lift the computer mouse while maintaining a button of the computer mouse in a depressed position, wherein said button is a top housing of the computer mouse; and
   an adjuster coupled to said first and second side ears, said adjuster being adjustable to control a force required to push said top housing.

3. A computer mouse comprising:
   a base of said computer mouse having a first fixed portion and a second fixed portion;
   a depressable housing coupled to said base such that said base is covered by said housing, wherein said housing forms a button that is activated when said housing is depressed;
   wherein said first and second fixed portions are accessible through said depressable housing when said depressable housing is depressed; and
   an adjuster coupled to said base, said adjuster being adjustable to control a force required to push said depressable housing.

* * * * *